March 17, 1953 D. F. McGILL 2,631,695
HYDRAULIC BRAKE AND PUMP
Filed June 27, 1949 3 Sheets-Sheet 1

INVENTOR
DANIEL F. McGILL

BY Cook and Schermerhorn
ATTORNEYS

March 17, 1953 D. F. McGILL 2,631,695
HYDRAULIC BRAKE AND PUMP
Filed June 27, 1949 3 Sheets-Sheet 2
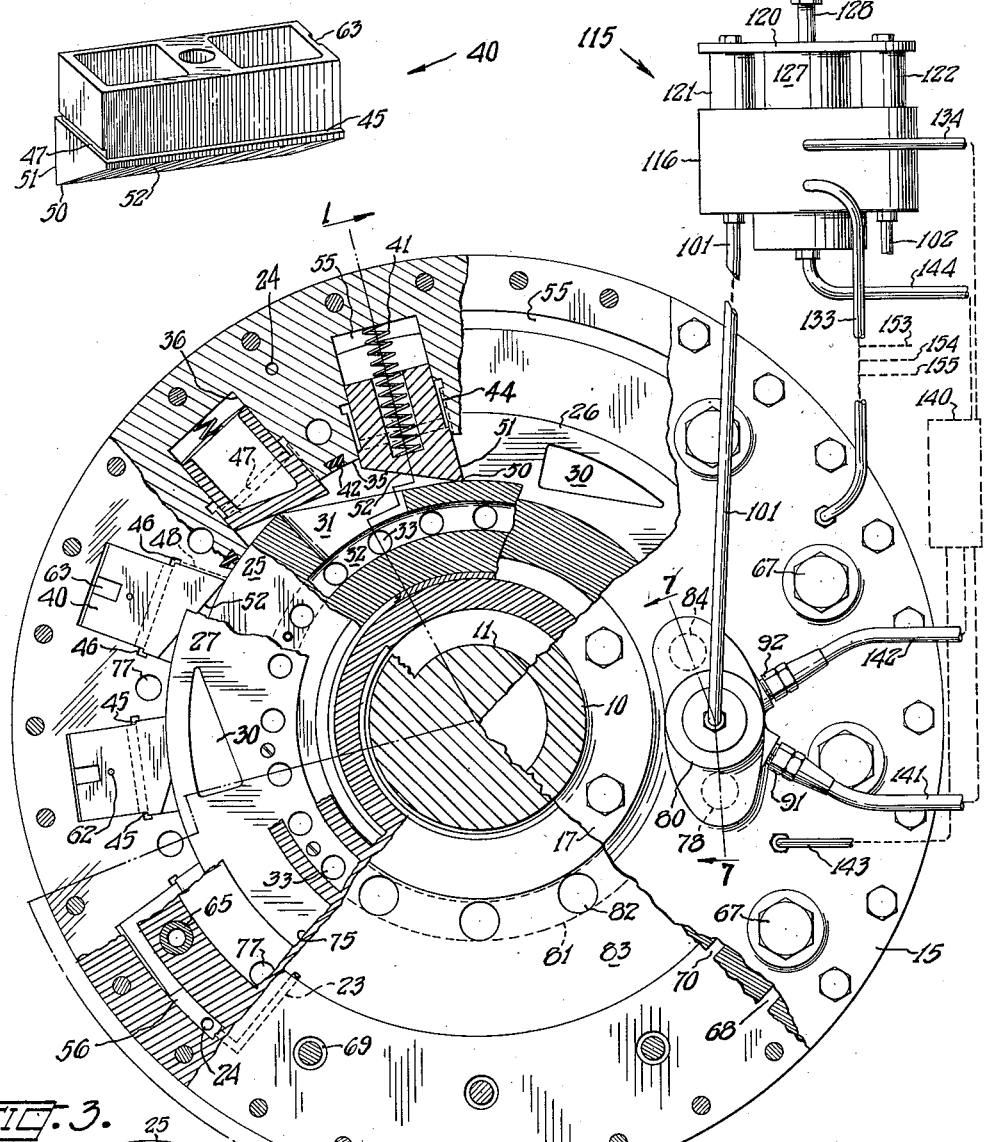
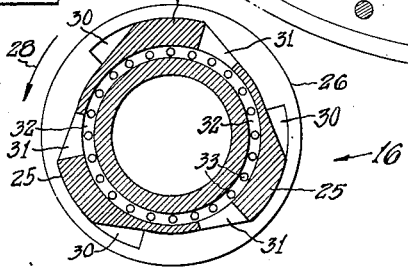
INVENTOR
DANIEL F. McGILL
BY Cook and Schermerhorn
ATTORNEYS March 17, 1953 D. F. McGILL 2,631,695
HYDRAULIC BRAKE AND PUMP
Filed June 27, 1949 3 Sheets-Sheet 3
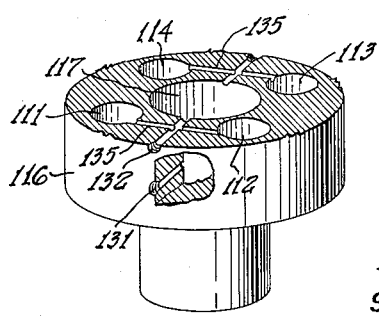
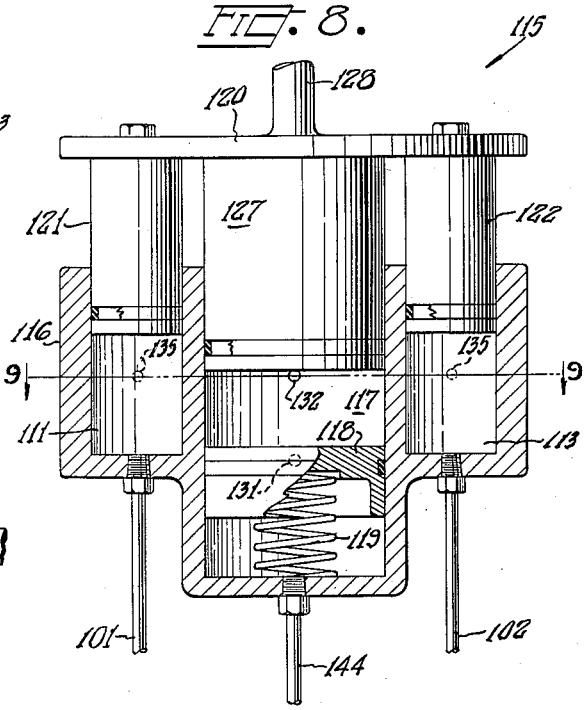
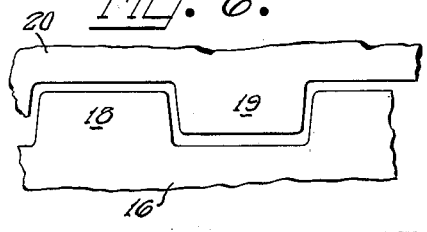
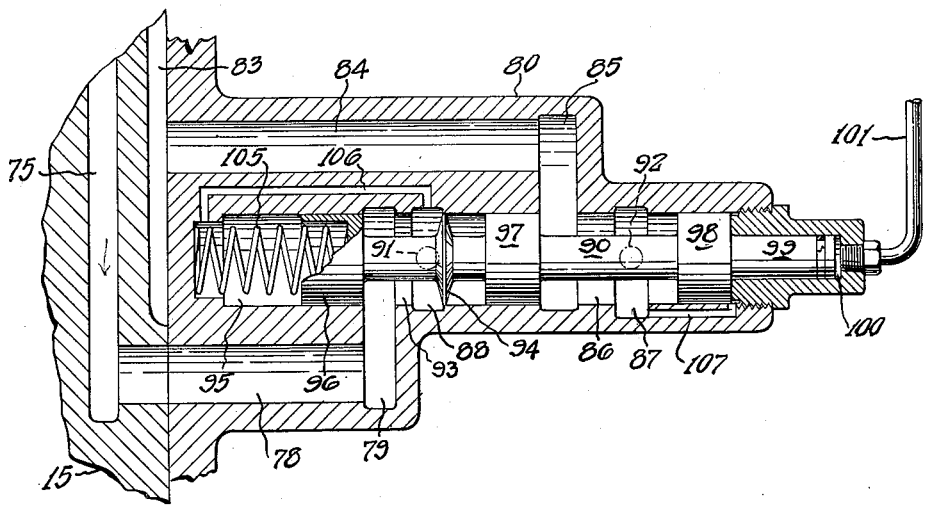
INVENTOR
DANIEL F. McGILL
BY Cook and Schermerhorn
ATTORNEYS Patented Mar. 17, 1953

2,631,695

UNITED STATES PATENT OFFICE 2,631,695

HYDRAULIC BRAKE AND PUMP

Daniel F. McGill, Portland, Oreg.

Application June 27, 1949, Serial No. 101,573

23 Claims. (Cl. 188—90)

This invention relates to a hydraulic brake having a rotary pump adapted to fit the hub of a vehicle wheel to exert a braking effort on the wheel by restriction of the flow of pumped fluid.

Primary objects of the invention are to provide a brake of the type described that can be readily installed on conventional new or used equipment to replace the mechanical friction brake mechanism, and to provide means for adapting the present brake to fit different types of wheels and axles.

Other objects are to provide a fluid pump type brake to control the operation of a wheel under heavy load with a minimum of fluid pressure and a minimum heating of the fluid in the pump mechanism, to provide a brake of this type that will permit the wheels to turn entirely free when the brake is not functioning, to provide a brake that will require no adjustment to keep it in operating condition, and to provide a pump type brake having exceptionally large areas of the working parts exposed to the fluid pressure in relation to the quantity of pump fluid.

Further objects are to provide improved rotary pump mechanism having blades so designed that the friction on the rotor may be controlled to bear a definite relation to the pressure of the fluid in the pump, to provide a novel form and arrangement of blades so that they are lifted out of the working circuit by fluid pressure after the leading tip of each blade passes a certain point in the working chamber, to provide means effective to hold the blades against the rotor only while the blades are passing through certain portions of each working chamber of the rotor, and to provide novel resilient fluid seals between the relatively rotating parts so that the rigid parts may run with more clearance under high pressures without excessive losses.

Still further objects are to provide a novel balanced control valve to control the operation of the pump by manual means or by air or vacuum remote control, and to provide a balanced control valve to control the output of the pump in either direction of rotation by movement of the valve in one direction.

In the present mechanism, the pump rotor is driven by the wheel of the vehicle and the pump stator is fixedly mounted. In the illustrated embodiment the pump stator is mounted on the stationary axle of a heavy duty trailer such as a log trailer which carries extremely heavy loads on each axle. Rotation of the pump rotor with the wheel pumps the hydraulic fluid, which is preferably a suitable oil, through a working circuit in which the rate of flow may be restricted by operation of a balanced control valve to exert a braking effect upon the wheel governed by the size of the valve orifice. The pump is a positive displacement type of pump whereby a hydraulic lock is formed between the pump rotor and stator to lock the wheel when the valve is entirely closed. The moving parts such as rotor, stator blades and valves are all hydraulically balanced so that there will be no undue loads or friction from unbalanced conditions.

Previous hydraulic brakes of this type have encountered serious problems in heavily loaded vehicles arising from extremely high fluid pressures and excessive heating in the pump equipment. These problems are met in the present equipment by providing a plurality of working chambers in the pump to furnish a greater total piston area and reduce the working pressure of the fluid, and, at the same time, making the fluid abutment blades very thick so as to occupy a major portion of the volume of the pump chambers through which the fluid must flow, to reduce the volume of pumped fluid in each revolution. The pump has three working chambers with three sets of suction and discharge ports whereby the fluid pressure is reduced to one-third the value that would be required to produce the same brake reaction in a single chamber. Both the volumetric displacement and the fluid pressures are thereby relatively small in relation to the magnitude of the braking effect which may be exerted to hold back a heavy load.

The greatest portion of the heat is generated at the orifice through the discharge port of the control valve, and this heat is removed from the pump mechanism and the wheel by mounting the valve outside of the pump unit and then conveying the heated fluid under low pressure to a suitable reservoir and, if necessary, also, to a heat exchanger, to cool the fluid before it is returned to the pump. Thus, operation of the brakes for a long period of time on a steep grade does not produce excessive heat in the pump mechanism. In view of the small volume of fluid in the working circuit, the reservoir and heat exchanger are relatively small.

Various features of the mechanism are applicable to pumps in general, and in the use of such features it is to be understood that the rotor may be driven by means other than the wheel of a vehicle to operate the pump. Various changes may be made in the construction and arrangement of parts, and certain features may be used without others. Still other objects and advantages will be appreciated by persons skilled in the art, and the invention will be better understood from the following description with reference to the preferred embodiment illustrated in the accompanying drawings.

In the drawings:

Figure 2 is an end elevation view of the mechanism with parts broken away to show the parts in cross section and elevation in different planes of view;

Figure 3 is a cross sectional view of the pump rotor;

Figure 4 is a perspective view of one of the radial blades of the stator;

Figure 6 is a fragmentary developed view of the wheel adaptor ring taken on the line 6—6 of Figure 1;

Figure 7 is a sectional view of the balanced control valve taken on the line 7—7 of Figure 2;

Figure 8 is a sectional view of the control device shown in Figure 2; and

Figure 9 is a perspective view of the body of the control device shown in section on the line 9—9 of Figure 8.

Figures 1, 5:
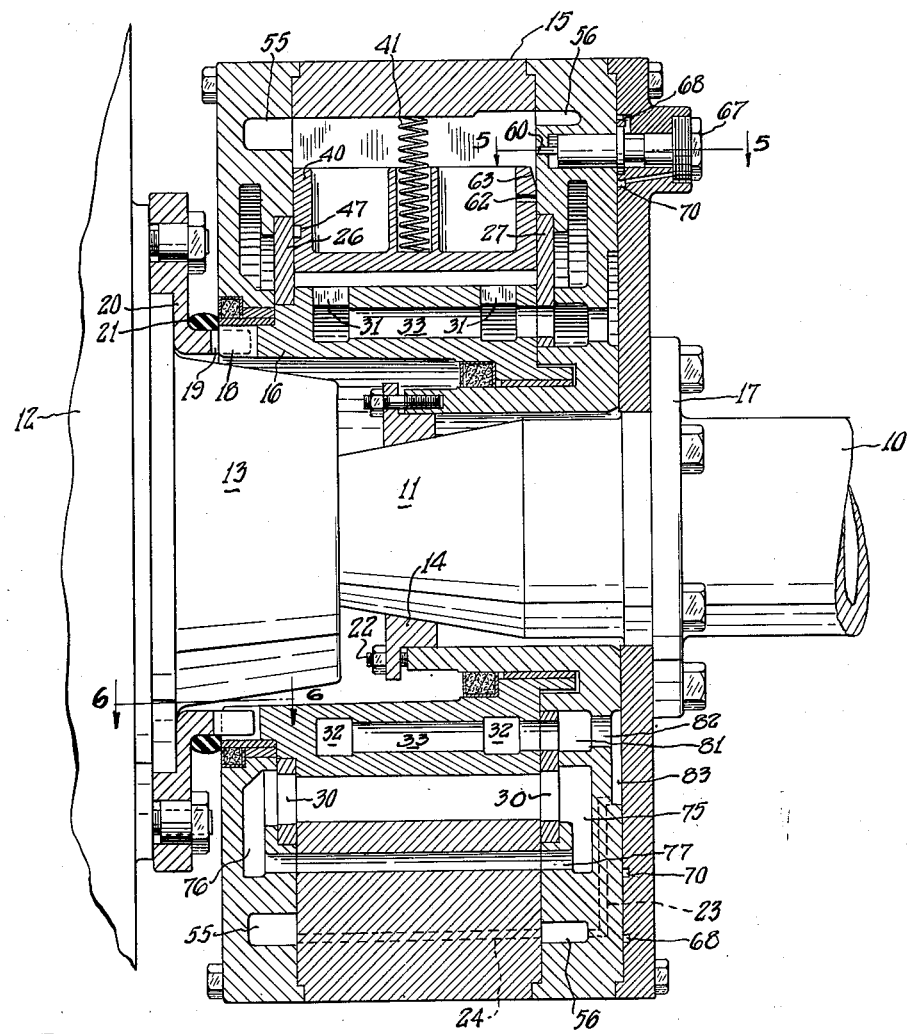
Figure 1 is a sectional view through the brake and pump mechanism taken on the line 1—1 of Figure 2.
Figure 5 is a sectional view taken on the line 5—5 of Figure 1.

The present mechanism is shown in Figure 1 applied to a non-rotating hollow trailer axle 10 having an integral solid wheel spindle 11. The numeral 12 designates a wheel having a hub 13 containing bearings mounted on the spindle 11. The pump mechanism comprises a stator housing 15 mounted on the axle and a rotor 16 adapted to be driven by the wheel. Suitable adaptors are provided for mounting the device on different types of wheel and axle assemblies. The numeral 17 designates an adaptor ring bolted to the housing 15 to secure the housing on the tubular axle 10, and it will be understood that other adaptor rings may be provided for mounting the housing on I-beam axles and the like. The adaptor ring is drawn up against an axle flange by a wedge ring 14 which is tightened on the tapered spindle by nuts on studs 22 extending from the housing 15.

The rotor 16 is not connected rigidly with the wheel, but is equipped with end splines 18 having a loose fit with similar splines 19 on a wheel adaptor ring 20, forming a driving connection in the nature of a dental clutch. The numeral 21 designates a ring seal to keep out dirt. The rotor is thereby constrained to rotate with the wheel without being affected by any disalignment of the wheel spindle or looseness of the wheel bearings.

*The rotor and stator*

Referring now to Figure 3, the rotor 16 has three lobes or fluid pistons 25 disposed between circular end walls 26 and 27, only the one end wall 26 being visible in this view. The forward direction of rotation is indicated by arrow 28. End flanges 26 and 27 are pierced by axial discharge ports 30 positioned immediately on the advancing side of each piston lobe 25. Radial suction ports 31 are provided on the trailing side of each piston lobe 25 communicating with a pair of annular rotor channels 32. Longitudinal holes 33 extend through the entire length of the rotor, including its end flanges 26 and 27, to supply the channels 32. Thus it will be apparent from Figure 3 that when the rotor 16 is placed in a stator housing with inwardly directed radial blades to constitute fluid abutments, a fluid pump will be formed. There will be three working chambers between the three piston lobes 25, and, when the rotor is caused to revolve in the direction of arrow 28, fluid will be forced out of these chambers through discharge ports 30, and will be replenished by new fluid drawn in through suction ports 31.

The stator housing 15 has an internal cylindrical wall 35 to form a running fit with the rotor lobes 25, as shown in Figure 2. The wall 35 has a number of radial slots 36 considerably in excess of the number of rotor lobes, for the stator blades 40. One of these blades is illustrated in Figure 4. Springs 41 and also fluid pressure means are utilized to urge the blades 40 into engagement with the rotor to form fluid abutments for pumping chambers between the lobes 25 at times when braking action is desired. The blades are made relatively thick and are spaced close together as viewed in Figure 2 in order to reduce the volumetric capacity of the pump chambers and hence reduce the amount of fluid which must be handled in the working circuit. The use of thick blades permits the use of large piston areas and low pressures without producing a correspondingly large displacement of the pump.

Between the blade slots 36 the wall 35 is equipped with longitudinal slots having L-shaped seals 42 to engage the rotor lobes 25 so that it will not be necessary for the blades 40 to contact these lobes to seal the pumping chambers. The shape of the seals 42 provides an extended area subjected to the fluid pressure in the pump chambers whereby the resilient material of the seal is compressed against the walls of the slot to cause its sealing lip to be raised out of the slot to engage the rotor lobes. The seal is thus responsive to the pressure requirements so that it will press rather firmly against the rotor lobes under high fluid pressures and will relax to withdraw its sealing lip substantially into the slot to engage the rotor lobes only lightly when the pressure is relieved. With the use of such seals it is possible to retract the stator blades by a special means so that they are not required to ride on the ramp surfaces of the rotor approaching and leaving the lobes 25 and are not required to touch the surfaces of the lobes to cause wear in the rotating fit between the rotor and stator.

Novel means are provided to control the extension and retraction of the blades 40. For the purpose of extending the blades, each blade slot 36 has a widened portion 44 at its outer end and each blade has shoulders 45 on its opposite sides exposed to fluid pressure in the wide part 44. Fluid pressure is communicated to the two shoulders 45 by means of grooves 46 and 48 in the slot wall, and a groove 47 in one end of the blade, to exert balanced forces on the two sides of the blades. Groove 48 communicates with the pump chamber on the high pressure side of the blade in forward rotation. The edge or toe of the blade 50 which engages the rotor is preferably substantially at or close to the high pressure side 51 of the blade.

In addition to the spring force which is constant, each blade is thereby urged outwardly by the fluid pressure reaction on the two shoulders 45, which is proportional to pump chamber pressure. Thus, as soon as the leading edge of a discharge port 30 passes the toe edge 50 of a blade, the chamber pressure is immediately admitted to the other side of that blade to act on its large end surface 52 to retract the blade into the bottom of its slot and out of contact with the rotor. This occurs as each toe edge 50 is approached by a ramp surface leading up to an approaching lobe 25 so that the blades never touch these parts of the rotor. It will be observed in Figure 3 that each discharge port 30 extends from the high part of a lobe to the smallest radius of the rotor. As the rotor revolves, the blades are all retracted in sequence so that none of them ever touch the lobes 25 nor the ramp surfaces on the approach sides of the lobes. To allow free movement of the blades in this manner the bottoms of the blade slots all communicate with annular channels 55 and 56 in the stator housing at opposite ends of the rotor. As the blades move out and in there is an interchange of fluid between the different blade slots through these annular channels. Suction pressure is communicated to channel 56 through passages 23 and 24 to prevent resistance to retraction.

When the brake is not in operation, the blades 40 are all held in retracted position by individual latch pins 60 engageable in holes 62 in the ends of the blades. Adjacent the hole 62 each blade is equipped with a sloping latch surface 63 whereby retraction of the blades causes latch pin 60 to be pressed back against latch spring 64 until the hole 62 is in registry with the latch pin. The latch pin 60 and its spring 64 are mounted in a piston 65 which is urged toward latching position by a spring 66 seated in a plug 67 as shown in Figure 5.

The latch pins 60 are all retracted to release the blades by introducing fluid pressure into an annular channel 68 communicating with a cylinder space 69 under the piston 65. An annular channel 70 is provided to relieve the fluid pressure in cylinder space 71 and also in the space under each plug 67, so that the latch pistons will move freely. When sufficient fluid pressure is introduced into each cylinder space 69 to overcome the spring 66, the latch pins 60 are all retracted, allowing the blades to move back and forth in their slots according to the changes in pressure balance occuring on the blade ends 52 and shoulders 45.

*Fluid circuit and control valve*

The high pressure portion of the fluid circuit which is subjected to brake torque reaction pressures is confined to passages and channels in the stator housing 15 and a control valve housing which is mounted on the stator housing. The high pressure discharge from ports 30 is delivered into annular channels 75 and 76 in stator housing 15, best shown in Figure 1. These channels are interconnected by a plurality of longitudinal passages 77 extending between the stator blades to convey the entire pump discharge into a passage 78 leading to discharge chamber 79 in control valve housing 80 shown in Figure 7. Suction passages 33 in the rotor communicate with annular channels 81 in the stator housing, which in turn communicate through holes 82 with an annular channel 83. Channel 83 communicates with passage 84 leading to chamber 85 in the valve housing 80. Chambers 79 and 85 communicate with different parts of a valve cylinder 86 which has an outlet chamber 88. Within the cylinder 86 is mounted a balanced control valve 90 having piston elements to control the braking action by regulating the fluid flow through pipe connector fittings 91 and 92 to an external fluid circuit shown in Figure 2.

Discharge chamber 79 in the valve housing has a port 93 opening into outlet chamber 88 and adapted to be closed by a thin, disc-like piston 94 on the stem of valve 90. Piston disc 94 is movable entirely through the short cylindrical bore of port 93 and is capable of entering the bore 95 for a piston 96 on the end of the valve stem. The stem of valve 90 also carries pistons 97 and 98 and an end portion 99 which forms an actuating piston operable in an actuating cylinder 100. A pipe 101 is connected with the end of cylinder 100 to supply fluid pressure to move the entire valve 90 to the left against the force of a spring 105 in piston 96. Bleed passages 106 and 107 relieve trapped fluid from the spaces behind pistons 96 and 98.

The various piston elements just described are so arranged on the stem of valve 90 as to occupy the positions shown in Figure 7 when the valve is moved to the right by spring 105 upon release of pressure from pipe 101, causing piston 98 to seat against the end of cylinder 100, which cylinder may constitute a separate fitting in the nature of a bushing screwed into the housing 80, as shown. In this position of the valve, port 93 is wide open to allow free discharge flow from the pump between chambers 79 and 88, and to allow free suction flow between chambers 87 and 85. When a small amount of fluid is introduced into the end of cylinder 100 behind piston 99, the piston disc 94 is moved toward the port 93 to form a restricted orifice and throttle the pump discharge to exert a braking effect on the pump rotor which is connected with the vehicle wheel. The braking effect is controlled by adjustment of the position of piston disc 94 relative to the edge of port 93, whereby, if sufficient fluid is admitted into the cylinder 100, the disc 94 will be carried into the port 93 to stop the discharge flow entirely and lock the wheels against forward rotation. When disc 94 moves into port 93 the piston 98 enters the chamber 87, but the portion of cylinder 86 constituting a port between chambers 87 and 85 is not yet restricted.

To make the brake function for reverse rotation of the wheel, more fluid is forced into cylinder 100 to move the piston element 98 closer to the port 86 to form a restricted orifice. When piston 98 is moved far enough to enter this port, it is thereby closed and the wheels are locked against reverse rotation. In this position of piston element 98 the piston disc 94 has moved clear through the cylindrical port 93, so that this port is again opened to permit forward rotation. The pump rotor may be locked against rotation in both directions by forcing still more fluid into cylinder 100 to move piston element 97 into the port 93, in which position of the valve the piston element 98 still closes the port 86. Thus, by various degrees of movement in one direction, the balanced valve 90 may be adjusted to regulate the braking effect in either forward or reverse direction separately, or to lock the rotor against movement in either direction.

For four wheel brakes there are four pipe lines 101, 102, etc., connecting the individual wheel brakes with four cylinders 111, 112, etc., in a master control unit 115 shown in Figures 2 and 8. It is accordingly understood that there is one cylinder and pipe such as the cylinder 111 and pipe 101 for each brake assembly shown in Figures 1 and 2. The four cylinders 111, 112, 113 and 114 are formed in a body member 116 in a group surrounding a larger central cylinder 117. Cylinder 117 is equipped with a floating cylinder head 118 urged away from the fixed end of the cylinder by a spring 119.

An actuating member in the form of a cross head 120 carries four pistons 121, 122, etc., for the four smaller cylinders, as shown, and a large piston 127 for the cylinder 117. The cross head 120 is also equipped with a post 128 carrying an adjustable clevise 129 for connection with a suitable operating member such as a lever arm or servo mechanism which may be controlled by the operator in the cab of the tractor vehicle to apply and release the brakes.

The housing 116 has upper and lower passages 131 and 132 leading to the cylinder 117 and connected externally with pipes 133 and 134. The inner ends of passages 131 and 132 appear as ports in the large cylinder 117 in Figure 8. Cross passages 135 connect the passages 132 with the four smaller cylinders as shown in Figure 9. These cross passages appear as ports at 135 in Figure 8 and are on a level with the passage and port 132.

Figure 2 includes a diagrammatic representation of the external fluid circuit and control lines. The numeral 140 designates a supply reservoir which may also include a heat exchanger to cool the oil, if desired. The two fittings 91 and 92 in the control valve housing 80 are connected with reservoir 140 by pipes 141 and 142. Pipe 133 from the master control unit connects with annular channel 68 in the stator housing and pipe 143 connects the reservoir 140 with the parallel channel 70. Branch pipes 153, 154 and 155 from pipe 133 lead to the other three wheel brakes of the trailer.

*Operation*

Braking effects are applied with equal force on all four wheels by depressing the cross head 120 carrying its five pistons.

The first operation which must be completed before any braking effect can be exerted consists in the withdrawal of latch pins 60 from the stator blades 40 to start the fluid pumping action in the brake pump assembly in each wheel. It will be observed in Figure 8 that the initial downward movement of large piston 127 immediately closes the port at 132 leading to the reservoir 140, whereas additional movement is required to cause the shorter pistons 121, 122, etc., to cover the ports at 135 in the individual brake cylinders. As soon as port 132 is covered by piston 127, the floating cylinder head 118 is pushed down by the liquid in the cylinder to uncover port 131, allowing liquid to be displaced from cylinder 117 into the four pipes 133, 153, 154 and 155 leading to the annular channels 68 in the brake stator housings. In this initial movement the piston 127 displaces enough fluid from cylinder 117 to actuate all the latch pistons 65 in the four brake assemblies by the time the four short pistons 121, 122, etc., cover the ports 135. As the four short pistons approach ports 135 they displace liquid through pipe 134 into the reservoir without building up a pressure in pipes 101, 102, etc., to move the control valves 90.

After the four short pistons pass the ports 135, fluid is displaced from cylinders 111—114 through pipes 101, 102, etc., to move the balanced control valves 90. The additional movement imparted to the cross head 120 then moves the piston discs 94 toward the orifice ports 93 as required to produce the desired braking action. When further movement of the control valves 90 is needed to exert a braking effort for reverse rotation, or to lock the wheels against rotation in either direction, the desired effect is obtained by depressing the cross head 120 further to displace more fluid into each control valve actuating cylinder 100.

During these varied movements of the control valve actuating pistons 121, 122, etc., the large piston 127 must hold all the blade latch pins 60 retracted without bottoming against a solid volume of liquid in cylinder 117. This is accomplished by the action of the floating cylinder head 118 which can move down ahead of the piston 127 to increase the effective length of cylinder 117 without requiring the displacement of any more liquid through port 131 into the cylinder spaces 69 behind the blade latch pistons 65, which spaces are already filled. In the course of this movement of piston 127, the spring 119 acting on head 118 as a second piston maintains the necessary pressure on latch pistons 65 to hold them retracted until all the master control unit pistons are raised to again uncover the ports 132 and 135.

When the cross head 120 is returned to its rest position shown in Figure 8, the cylinders 111—114 are vented to atmospheric pressure which is maintained in the reservoir 140, causing the control valves 90 to be returned to the end position shown in Figure 7 and the latch pins 60 to be extended as shown in Figure 5. The next one-third revolution of the rotor 16 then causes all the stator blades 40 to be retracted to the bottoms of their slots, where they are immediately engaged by their respective latch pins so that the fluid contained between the lobes of the rotor may revolve freely within the cylindrical wall 35 of the stator without any pumping action. This is the normal running condition wherein all the blades are latched back in their slots so they cannot contact the revolving rotor, and wherein the resilient seals 42 are relaxed so that they make only very light contact with the passing rotor lobes.

The reservoir 140 maintains all parts of the system full of liquid. When the latch pins 60 are retracted, springs 41 immediately extend the blades 40, as shown in Figure 2, to establish fluid pumping chambers between the stator and rotor. As the lobes of the rotor approach the blades 40 pressure is established in these working chambers according to the restriction imposed upon the discharge of fluid through the valve port 93. This fluid pressure in the working chambers reacts against the piston areas of the rotor lobes in opposition to the rotating torque to produce the desired braking effect on the vehicle wheels.

The stator blades 40 constitute fluid abutments in the pump chambers and prevent leakage at the surface of the rotor whereby the rotor cannot turn except as fluid is displaced through the discharge ports 30. In forward rotation, blades 40 are held in sealing engagement with the rotor by fluid pressure admitted through grooves 44 to react on the shoulders 45 of the blades to supplement the force of springs 41. When the toe edge 50 of each blade is substantially at its pressure face 51, the shoulders 45 may be very narrow as there is then substantially no fluid pressure component acting in a direction to retract the blade. The present design, however, permits the rotor engaging edge 50 to be moved back from the pressure face 51 without affecting the operation of the pump. In such case the blade shoulders 45 are made wider so as to have a greater total area than the projected area on the end of the blade exposed to pump chamber pressure.

As soon as a discharge port 30 has advanced past the point of contact of the blade with the rotor, fluid pressure is introduced behind such blade in contact with its end face 52 to retract the blade. The pressure chamber is thereby advanced around to the next blade in engagement with the rotor, which then functions as a fluid abutment until it is in turn also passed by the discharge ports 30. The three sets of discharge ports are spaced so that they do not pass stator blades simultaneously. After the rotor lobe following a discharge port 30 passes a blade, the end face 52 passes adjacent a suction port 31, as shown in Figure 2, causing that blade to again be extended into contact with the rotor. Owing to the thickness and close spacing of the blades, the volumetric displacement is relatively small in comparison with conventional rotary pumps having the same physical dimensions.

In reverse rotation, in which circumstance the braking requirements are seldom severe in a vehicle, the pressure chambers are formed on the opposite sides of the blades and the shoulders 45 are then ineffective to extend the blades because they are not in communication with the pump pressure. Under this condition fluid pressure is communicated through channel 56, which is normally a suction channel, to the inner ends of the blades in the bottoms of the blade slots. When the inner ends of the blades have less area than the projected area of the sloping outer end faces 52, as shown in Figure 2, the springs 41 must compensate to provide the necessary balance of forces to hold the blades in contact with the rotor. If the point of contact 50 is sufficiently remote from the face 51 that the projected area of the end face 52 is less than the blade area exposed to the pressure in the channel 56, then the hydraulic balance will be sufficient to hold the blades extended in reverse rotation. Reverse rotation does not affect the operation of the control device 115, since it is not connected with the pump chambers.

Having now described my invention and in what manner the same may be used, what I claim as new and desire to protect by Letters Patent is:

1. A device of the class described comprising a balanced, lobed rotor, a stator having a plurality of abutment blades exceeding the number of lobes on said rotor, said rotor, stator and blades forming a pump with a plurality of working chambers, intake and discharge ports in said rotor for said chambers, said blades being relatively thick in relation to their spacing to occupy a substantial volume in the pump and limit the displacement of said working chambers, means for applying working chamber pressure to said blades in sequence to hold the blades against predetermined portions of said rotor, and means for applying working chamber pressure to said blades in sequence to lift the blades from predetermined portions of the rotor, as the rotor revolves.

2. A device of the class described comprising a rotor, a stator having a plurality of blade pistons, said rotor, stator and pistons forming a pump with a plurality of working chambers, a plurality of intake ports and a plurality of discharge ports in said rotor for said working chambers, said pistons having springs urging them into contact with the rotor, said pistons being relatively thick in relation to their spacing to limit the displacement of said working chambers, guide slots in said stator for said pistons, said slots being wider at their outer ends than at their inner ends, shoulders on said pistons fitting the wide portions of said slots, fluid passages communicating the intake pressure of the pump to the ends of said pistons in the bottoms of said slots, and a fluid passage admitting said chamber pressure on one side of said pistons to said shoulders.

3. In a device of the class described, a rotor having a plurality of intake ports and a plurality of discharge ports, a stator having a plurality of movable blades, said rotor, stator and blades forming a pump with a plurality of working chambers, means to stop the movement of said blades, hydraulic means to control said stop means, valve means operable to control the flow of fluid through said intake and discharge ports with the pump working in either direction of rotation, and hydraulic means to operate said valve means.

4. In a device of the class described, a rotor having a plurality of intake ports and a plurality of discharge ports, a stator having a plurality of blades, said rotor, stator and blades forming a pump with a plurality of working chambers, said blades having springs urging them into contact with the rotor, means to hold the blades retracted, valve means operable to control the flow of fluid through said intake and discharge ports with the pump working in either direction, hydraulic means to control the operation of said valve means, hydraulic means to release said blades at the initiation of operation of said valve means, separate cylinder and piston assemblies for said two hydraulic means, and means connected with all of said cylinder and piston assemblies for operating said assemblies in unison.

5. In a device of the class described, a rotor having a plurality of intake ports and a plurality of discharge ports, a stator having a plurality of fluid abutment blades, said rotor, stator and blades forming a pump with a plurality of working chambers, said blades having springs to urge them into contact with the rotor, valve means operable to control the flow of fluid through said intake and discharge ports with the pump working in either direction, said valve means comprising a valve housing, a balanced piston type valve member in said housing, a stem on one end of said valve member forming a piston to move the valve member, a spring acting on the opposite end of said valve member tending to hold the valve member in open position, and fluid pressure means connected with said housing in communication with said piston stem to adjust the position of said valve member.

6. In a device of the class described, a rotor, a stator having a plurality of blade pistons, said rotor, stator and pistons forming a pump with a plurality of working chambers, intake and discharge ports in said rotor for said chambers, said pistons having springs to urge them into contact with the rotor, said stator having guide slots for said pistons, said slots being wider at the top than at the bottom, said pistons having shoulders to fit the wide portions of said slots, fluid passage means connecting the intake pressure of the pump to the bottoms of said slots, fluid passage means communicating the pump chamber pressure to said shoulders on said pistons, each piston having a contact edge to engage the rotor closely adjacent the side of the piston facing an approaching discharge port as the rotor revolves and having a beveled surface adjoining said contact edge exposed to the suction pressure of the pump while said discharge ports are approaching the piston, said contact edge having substantially line contact with the rotor so that the fluid pressure on said shoulders acting in conjunction with the piston spring will be effective to hold the piston against the rotor until a discharge port passes the piston.

7. In a device of the class described, a rotor, a stator having a plurality of blade pistons, said rotor, stator and pistons forming a pump with a plurality of working chambers, intake and discharge ports in said rotor for said chambers, said pistons having springs to urge them into contact with the rotor, said stator having guide slots for said pistons in which the outer portions of said slots are wider than the inner portions, shoulders on said pistons to fit the wide portions of said slots, fluid passage means communicating the intake pressure of the pump to the piston ends in the bottoms of said slots, and fluid pressure means communicating discharge pressure of the pump to said blade shoulders as said discharge ports approach said pistons, whereby the relation of the shoulder area to the area of the end of the blade in the bottom of the slot determines the amount of fluid pressure holding the blades against the rotor.

8. In a device of the class described, a rotor, a stator having a plurality of abutment blades, said rotor, stator and blades forming a pump with a plurality of working chambers, intake and discharge ports in said rotor for said chambers, means to hold said blades in retracted position comprising a first spring extended plunger, a second spring extended plunger mounted in said first plunger to engage one of said blades, a cylinder for said first plunger in said stator, and hydraulic control means for said plungers comprising a piston and a cylinder having a tube connecting with said plunger cylinder.

9. In a device of the class described, a rotor, a stator having a plurality of blade pistons, said rotor, stator and pistons forming a pump with a plurality of working chambers, intake and discharge ports in said rotor for said chambers, said pistons having springs to urge them into contact with the rotor, said pistons being relatively thick in relation to their spacing to limit the displacement of said working chambers, said stator having guide slots for said pistons, the tops of said slots being wider than the bottoms of the slots, shoulders on said pistons to fit the wide portions of said slots, fluid passage means connecting the intake pressure of the pump to the ends of the pistons in the bottoms of the slots, and fluid passage means connecting the discharge pressure of the pump to said shoulders on the pistons as the discharge ports approach the pistons, whereby the width of said shoulders determines the amount of fluid pressure force holding said pistons against the rotor, the rotor engaging ends of said pistons being thicker than the combined width of said shoulders, whereby said pistons will be retracted when their rotor engaging ends are exposed to working chamber pressure.

10. In a device of the class described, a pump having a housing equipped with a plurality of fluid abutment blades, means to control the flow of fluid through said pump comprising a valve housing, a balanced piston type valve member in said valve housing, a stem on one end of said valve member forming with said housing a piston and cylinder to move said valve member, a spring on the opposite end of said valve member urging it to a wide open position, means to hold said blades in retracted position comprising a first spring extended plunger, a second spring extended plunger mounted in said first plunger to engage a blade, a cylinder in said pump housing for said first plunger, and hydraulic means to control the operation of said blade holding means and said valve means comprising pistons and control cylinders, a tube connecting one of said control cylinders to said plunger cylinder and a tube connecting one of said control cylinders with said valve cylinder.

11. In a device of the class described, a pump having a housing equipped with a plurality of fluid abutment blades, means to control the flow of fluid through said pump comprising a valve housing, a balanced piston type valve member in said valve housing, a stem on one end of said valve member forming with said housing a piston and cylinder to move said valve member, a spring on the opposite end of said valve member urging it to a wide open position, means to hold said blades in retracted position comprising a first spring extended plunger, a second spring extended plunger mounted in said first plunger to engage a blade, a cylinder in said pump housing for said first plunger, hydraulic means to control the operation of said blade holding means and said valve means comprising pistons and control cylinders, a tube connecting one of said control cylinders to said plunger cylinder and a tube connecting one of said control cylinders with said valve cylinder, and means in said hydraulic control means to actuate said blade holding means before said valve member is actuated.

12. In a device of the class described, a rotor, a stator having abutment blades cooperating with said rotor to form a pump, inlet and outlet ports in said pump, slots in said stator confronting said rotor and extending parallel with the axis of the rotor between said blades, and a resilient sealing member seated in each of said slots having sealing surfaces exposed at the top of the slot to engage said rotor and having surfaces within the slots exposed to the working pressure in the pump and opposed to the walls of the slot to cause said sealing member to be compressed by said working pressure and raise said sealing surface out of the slot.

13. A fluid pump comprising a multi-lobed rotor, a stator having a cylindrical wall surrounding said rotor, longitudinal slots in said wall confronting said rotor and equipped with blades to engage said rotor to form fluid pumping chambers, inlet and outlet ports for said chambers, longitudinal slots in said cylindrical wall between said blade slots confronting said rotor, and resilient sealing means in said last named slots engaging said rotor lobes across the length of the rotor to seal each chamber at one of said lobes independently of said blades.

14. A fluid pump comprising a lobed rotor, a stator housing surrounding said rotor and having inwardly directed movable blades to engage the rotor and form fluid pumping chambers, inlet and outlet ports for said chambers, latch pins in said stator housing to hold said blades retracted, and fluid actuated pistons carrying said latch pins to release said blades, said pins being spring mounted in said pistons for independent movement to engage said blades.

15. A fluid pump comprising a lobed rotor having fluid inlet ports, a stator housing surrounding said rotor and having blades to engage the rotor and form fluid pumping chambers, means to hold said blades in engagement with the rotor comprising a blade surface exposed to fluid pressure in said chambers, and means to retract said blades comprising discharge ports in said rotor arranged to pass said blades when the rotor revolves in one direction to admit fluid pressure from said chambers behind the blades, with reference to said one direction of rotation, and a surface on the back side of each blade at the rotor engaging end of the blade exposed to said admitted pressure and opposed to said first surface, said second surface being of an extent to overbalance the pressure effects on said first blade surface.

16. A fluid pump comprising a lobed rotor having fluid inlet ports, a stator housing having blades movable into engagement with said rotor to form fluid pumping chambers, a surface on each blade exposed to the fluid pressure in said pumping chambers to extend the blade, a surface of greater effective area on the rotor engaging end of each blade exposed to fluid pressure behind the blade, relative to the said surface exposed to the fluid pressure in said pumping chambers, to retract the blade, and discharge ports in said rotor arranged to admit fluid pressure behind the blades in advance of the rotor lobes as the rotor revolves in one direction.

17. In a fluid pump having a lobed rotor and a stator housing with a cylindrical wall surrounding said rotor, radial slots in said wall, blades in said slots adapted to engage said rotor to form fluid pumping chambers, shoulders on said blades, grooves in said slots to admit fluid pressure from said pumping chambers to said shoulders to extend the blades, surfaces on the back sides of the blades relative to said chambers, at the rotor engaging ends of the blades, opposed to said shoulders to retract the blades when exposed to pump chamber pressure, and means to admit pump chamber pressure to said back side surfaces in advance of an approaching rotor lobe in one direction of rotation.

18. In a pump, an annular stator having a peripheral wall and end walls with annular recesses in said end walls, a lobed rotor having end flanges rotatable in said recesses, and a plurality of inwardly directed stator blades mounted for movement between said stator end walls and fitting between said rotor end flanges.

19. In a pump having a stator with a plurality of radial blades, a rotor having a plurality of lobes, a radial port in said rotor on one side of each lobe, radial end flanges on said rotor, and axial ports in said flanges at the opposite sides of said lobes in a peripheral direction from said radial ports.

20. In a pump havng a stator with a plurality of radial blades, a rotor having a plurality of lobes, a radial port on one side of each lobe, a passage in said rotor interconnecting all of said radial ports, radial end flanges on said rotor having a radius exceeding the radius of said lobes, and axial ports in said flanges at the opposite sides of said lobes in a peripheral direction from said radial ports.

21. In a pump, an annular stator having a peripheral wall and end walls, each of said end walls having an annular recess, a lobed rotor having circular end flanges of a radius exceeding the radius of the rotor lobes rotatable in said recesses, a plurality of inwardly directed stator blades mounted for movement between said stator end walls and fitting between said rotor end flanges, intake and discharge ports in said rotor, and annular passages in said end walls of the stator communicating with said rotor ports.

22. In a device of the class described, a rotor, a stator having a plurality of abutments, said rotor, stator and abutments forming a pump with a plurality of working chambers, intake and discharge ports in said rotor for said working chambers, said stator having grooves confronting a peripheral surface of the rotor and parallel with the axis of the rotor between said abutments, and a resilient member seated in each of said grooves engaging said peripheral surface of the rotor in line contact across the length of the rotor to form a seal between said stator and said rotor.

23. A fluid pump comprising a multi-lobed rotor, a stator surrounding said rotor having inwardly directed blades in excess of the number of lobes on said rotor, said blades being extendible into engagement with said rotor to form fluid pumping chambers, suction and discharge ports in said rotor for said chambers, and means to extend said blades to engage said rotor as said discharge ports approach the respective blades, said discharge ports being arranged to introduce fluid pressure from said chambers to end surfaces on the rotor-engaging ends of said blades as said discharge ports pass the respective blades to retract said blades immediately in advance of an approaching rotor lobe.

DANIEL F. McGILL.

REFERENCES CITED

The following references are of record in the file of this patent:

UNITED STATES PATENTS

| Number | Name | Date |
| --- | --- | --- |
| 625,689 | Kingsland | May 23, 1899 |
| 638,910 | Couture | Dec. 12, 1899 |
| 723,226 | Anderson | May 24, 1903 |
| 1,635,389 | Nettenstrom | July 12, 1927 |
| 1,805,985 | Jolly | May 19, 1931 |
| 2,048,206 | Tyler | July 21, 1936 |

FOREIGN PATENTS

| Number | Country | Date |
| --- | --- | --- |
| 125,165 | Germany | Nov. 27, 1901 |
| 514,345 | France | Nov. 13, 1920 |